Sept. 12, 1961 H. H. HARMS 2,999,597
BACKWASH FILTERING SYSTEM
Filed Aug. 5, 1958 2 Sheets-Sheet 1
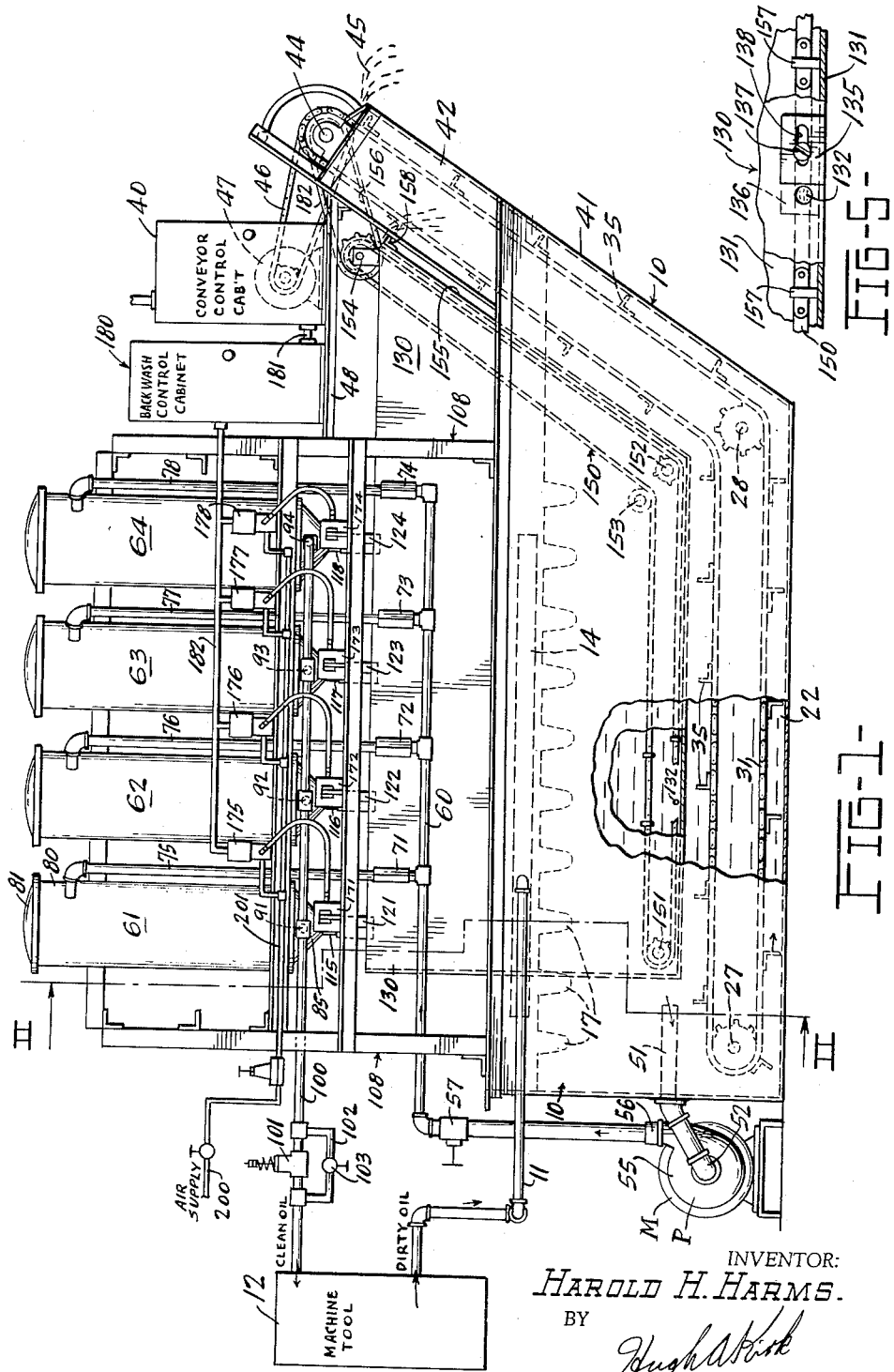
INVENTOR:
HAROLD H. HARMS.
BY
Hugh A Kirk
ATTY.

Sept. 12, 1961  H. H. HARMS  2,999,597
BACKWASH FILTERING SYSTEM
Filed Aug. 5, 1958  2 Sheets-Sheet 2
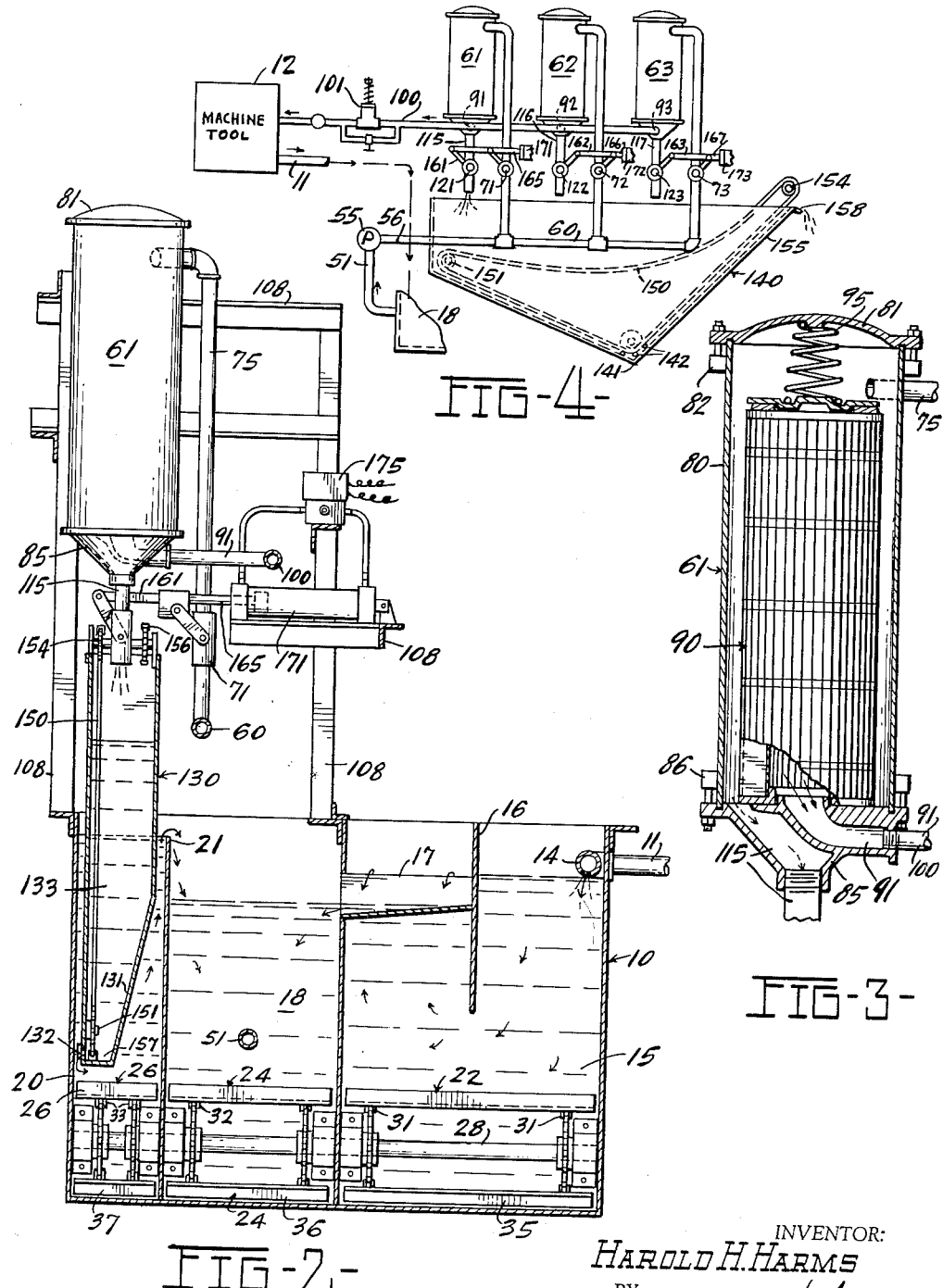
INVENTOR:
HAROLD H. HARMS
BY
Hugh A. Link
ATTY.

United States Patent Office 2,999,597
Patented Sept. 12, 1961

2,999,597
BACKWASH FILTERING SYSTEM
Harold H. Harms, 1404 Palmetto St., Toledo 6, Ohio
Filed Aug. 5, 1958, Ser. No. 753,244
15 Claims. (Cl. 210—333)

This invention relates to an apparatus for separating solids from liquids. More particularly, it relates to apparatus in which the heavier solids may be allowed to settle out by gravity from the liquid, while the lighter solids may be removed by filtration, the liquid being moved in a substantially continuous manner through the apparatus, and the filtration being carried out in a filter bank or series of filtering units adapted for individual and alternative automatic backwash cycles for removing the fine particles collected therein and for recycling the backwash liquid through the system. For example, such filtering systems find particular use in separating the cuttings or swarf from cooling liquids or coolants so that these liquids may be re-circulated through machine tools, automatic cutting and grinding machines, and the like.

Filtering systems heretofore have included various types of settling tanks in which solid materials may gravitate downwards through or from the carrying liquid towards the bottom of the tank; the heavier particles being removed therefrom by means of a flight conveyor or other suitable means in a more or less common and continuous manner. Finer particles may not always be removed to a satisfactory degree solely by settling and special devices must be resorted to in an effort to remove a greater proportion of fine particles from such systems.

Accordingly it is an object of this invention to provide a simple, efficient, effective and economic continuous settling and backwash filtering apparatus and system for removing substantially all of both fine and heavy particles from a liquid carrying such particles.

Another object is to provide such a filtering system with a plurality of parallel filtering units, whereby one filtering unit may be backwashed while the other filtering elements are operating, and which elements are sufficient in number also to supply filtered liquid for a quick and efficient backwashing of one of said filtering units without materially effecting the flow of purified liquid from the system, and without the necessity of employing a separate pressurized backwashing fluid and surge tank therefor.

Another object is to provide such a system having an automatic valve mechanism for periodically controlling the backwashing of separate filtering units in such a parallel series of such unit.

Another object is to provide for such a backwash filtering system a secondary, intermediate or seepage reservoir or tank into which the backwashed particles from the filtering units may be quickly discharged and then from said seepage tank gradually and slowly introduced or recycled back into the settling portion of the system without causing turbulence or affecting the settling therein.

Another object is to provide such a secondary or seepage tank with drain apertures therein and mechanical means for insuring non-clogging of these apertures by the particles backwashed off of the filtering units.

Another object is to provide such a system with a drive mechanism and control to maintain a predetermined rate of discharge of particles both from the settling part of the tank and the seepage tank, as well as to control the operation of the valves for intermittently and successively backwashing the filtering units of the system.

Another object is to provide safety valves and means for such a system including resiliently holding the filter elements or cartridges in the filtering units against their normal outlets, so that an excessive backwashing pressure may be relieved without damaging the system or the filter cartridge therein.

Generally speaking, the system or apparatus of this invention comprises three main parts: first, a settling part in which the heavy particles of the liquid to be purified are removed by settling in a tank or reservoir which may comprise a plurality of baffled partitions, compartments and weirs to maintain a substantially quiet or non-turbulent flow of the liquid to promote as much settling as possible; second, a filtering part in which the smaller particles which will not settle are removed which may comprise a plurality of parallel filtering units which may have removable filter cartridges therein and a pump forcing the settled liquid from the settling part through the filtering part under pressure; and thirdly, a backwashing part for successively quickly and intermittently backwashing each of the filtering units in the series by the pressure in the filtered liquid from the other filtering elements and returning the backwash to the settling part which may comprise a seepage tank and automatic valve controlling means for the inlets and backwash outlets of each of said filtering units.

In the backwashing part of the system, the seepage tank permits the rapid backwash of each of the filtering units to be quickly collected and then to seep slowly back into the system, preferably through small apertures in the bottom of the seepage tank into the liquid being settled in the settling part of the system. The inlets and the backwash outlets of the filtering units are provided with reversing valves to simultaneously open a backwash outlet valve when that filtering units' inlet valve is closed, and vice versa, so that the outlet pressure from the other filtering units will backwash filtered liquid from the continuously open outlet ducts from all the filtering unit into the outlet duct of that inlet cut-off filtering unit to backwash that filtering unit through its simultaneously opened backwash oulet valve. Separating timing means may be provided for selectively operating these inlet and backwash valves, which may comprise directly operated solenoids, or solenoid operated control valves for controlling a separate fluid pressure supply to operate reciprocating fluid motors which in turn operate the desired inlet and backwash outlet valves. The timing may be controlled by the motor drive for the conveyors employed for removing the settled particles from the bottom of the settling part of the system, which motor drive also may operate means for removing settlings and/or cleaning the apertures at the bottom of the seepage tank to prevent them from becoming clogged by any particles backwashed off of the filtering elements. Furthermore, the filter cartridges in each filtering unit may be installed and held against their normally open outlet ducts by a spring so as to act as a relief valve if the backwashing pressure is too great to rupture the filter cartridge or otherwise cause damage. Similarly, in the outlet manifold or ducts from the filtering units there may be provided a pressure relief valve to maintain a predetermined back pressure on all of the filtering units to insure the rapid backwash of that unit which has its inlet valve shut off for its backwashing cycle.

The above mentioned and other features and objects of this invention and the manner of attaining them will become more apparent and the invention itself will be best understood by reference to the following description of embodiments of the invention taken in conjunction with the accompanying drawings, wherein:

FIG. 1 is a side elevation of one embodiment of an apparatus according to this invention showing a plurality of filtering units mounted on top of a seepage tank which seepage tank is suspended in a settling tank;

FIG. 2 is a slightly enlarged sectional view taken along line II—II of FIG. 1 showing one embodiment of compartments, weirs and baffles which may be employed in the settling tank, and also disclosing the backwashing valve connections for one of the filtering units;

FIG. 3 is an enlarged vertical sectional view through one of the filtering units showing the inlet and outlet ducts thereto and a pleated filter cartridge mounted therein;

FIG. 4 is a reduced schematic diagram, similar to FIG. 1, showing the piping arrangement for backwashing the filtering units, and also showing another form of seepage tank associated therewith; and FIG. 5 is an enlarged fragmenetary view of the lower portion of the seepage tank shown in FIGS. 1 and 2, disclosing means for varying the size of the seepage openings in the tank, as well as a moving chain means for both removing settlings from the bottom of the seepage tank and cleaning the seepage openings.

The settling part

Referring now to FIGS. 1 and 2, the specific embodiment of this invention disclosed herein will be described for a circulating coolant or cutting liquid for a machine tool in which the contaminated particles in the liquid are first passed into the settling tank 10 through a duct 11 from the machine tool 12 and thence distributed, such as by means of a perforated pipe 14 inside the upper portion of a first settling compartment or chamber 15 (see FIG. 2) in the tank 10. This compartment 15 may be provided with a central baffle 16 under which the liquid passes and thence from the chamber 15 over a plurality of parallel weir troughs 17 which increase the liquid flow without increasing turbulence and which empty into another or final settling chamber 18 from which the settled liquid may be withdrawn for passage into the second or filtering part of the system of this invention.

The settling part or tank 10 may also be provided with an additional compartment or chamber 20 into which the backwash liquid from the filters may be discharged, which chamber 20 may be connected to overflow by a weir edge 21 into the final liquid compartment 18 directly as shown, or it may be connected to overflow into the compartment 15 for further settling, if necessary. However, since the liquid which is backwashed from the filters has already been settled once, it has been found unnecessary to give it the amount of settling that is required for the incoming liquid from duct 11, and accordingly it may be passed more directly into the final settling compartment 18 as shown in FIG. 2.

Each of the compartments 15, 18 and 20 of the tank 10 may be provided with separate settled particle or swarf removing device, such as a bottom scraping conveyor 22, 24 and 26, respectively. These conveyors 22, 24 and 26 may comprise two or more shafts 27 and 28 journalled near the bottom ends of the tank 10 and mount on sprockets on said shafts in each compartment separate parallel pairs of sprocket chains 31, 32 and 33, respectively to which pairs of chains may be attached spaced transverse flights or scrapers 35, 36 and 37, respectively. These flights may move the settled material from the bottom of the tank, either continuously or intermittently, depending upon how they are driven from a power drive control cabinet 40 which may be located on top and at one end of the main tank 10. The main tank 10 may be provided with an inclined or sloping end 41 up which the conveyor flights 35, 36 and 37 may push the settled material and thence up an extending inclined chute 42 having a shaft 44 mounted above its upper end for sprockets for the conveyor chains, so that the settlings or swarf 45 may be dumped over the upper edge of the chute 42 for removal from the system, such as into a swarf box not shown. Each of the parallel conveyors 22, 24 and 26 may be driven from the common shaft 44 by gears, belt or a chain 46 connected to the power drive control cabinet 40, in which may be provided an electric motor 47 and gear reduction or other type mechanism which may continuously or intermittently drive the conveyors 22, 24 and 26. This power drive control cabinet 40 may be mounted on a frame structure 48 above one end of the main tank 10 to conserve as much more space as possible for the system.

The filtering part

The resulting settled liquid in compartment 18 of the settling tank 10 may be withdrawn below its surface in the compartment by means of a duct 51 connected to the suction intake 52 of a motor driven pump 55, the pressurized outlet duct 56 from which pump may pass through a valve 57 to be connected to an inlet pressurized manifold 60, which equally distributes the settled pressurized liquid into and through the filtering units 61, 62, 63 and 64 via separate inlet valves 71, 72, 73 and 74 in the filtering element inlet ducts 75, 76, 77 and 78, which may enter near the top of the outside housing or container 80 of each of the filter units.

Referring now to FIG. 3, each of the filtering units 61, 62, 63, and 64 may comprise a cylindrical container 80 with a removable top 81 which may be bolted or otherwise clamped to a flange or lugs 82 around the top outside edge thereof, and have a bottom duct providing portion 85, which may be similarly connected by bolts to lugs 86 to the bottom end of the cylindrical housing. The top 81 may be easily removed so that the filter element or cartridge 90 may be easily replaced when necessary, which cartridge herein is shown to comprise a pleated filter element, the upper end of which may be pressed downwardly by a compression spring 95 over the continuously open outlet duct 91 in the bottom portion 85. This cartridge 90 and its housing or container 80 may be similar to that described in the Harold H. Harms copending U.S. patent application Serial No. 718,846 filed March 3, 1958. Normally the settled but unfiltered liquid enters the chamber 80 around the outside of the pleated filter cartridge 90 through inlet duct 75, and thence is filtered through the pleated filter cartridge 90 through inlet duct 75, and thence is filtered through the pleated filter 90, with the resulting filtered liquid passing out and downwardly through the center of the cylindrical pleated filter cartridge through the continuously open outlet duct 91 into an outlet manifold 100. This outlet manifold 100 may be connected to the open outlet ducts 92, 93 and 94 of all the other filtering units 62, 63 and 64, and a pressure relief or check valve 101 may be placed in its common outlet. If desired a by-pass duct 102 having a valve 103 may be located around the check-valve 101. The filter liquid from valve 103 may then pass to the machine 12 for re-use and recontamination before being returned or recycled through duct 11 to the main settling tank 10 of the apparatus of this invention.

The plurality of parallel filtering elements 61, 62, 63 and 64 and their corresponding inlet and outlet manifolds 60 and 100, may be supported on a frame 108 above the surface of the top of the tank 10 as shown in FIGS. 1 and 2, which frame may be connected with the frame 48 for supporting the power drive control mechanisms for this apparatus.

The backwashing part

In the bottom portion 85 of each of the filtering units 61, 62, 63 and 64 there may also be provided an additional backwash discharge duct 115 as well as the duct 91, which duct 115 may be connected to the bottom outside of the filter cartridge 90 in the chamber 80, as shown in FIG. 3. In the backwash outlet ducts 115, 116, 117 and 118 of each of these filtering units 61, 62, 63 and 64 there is provided a valve 121, 122, 123 and 124, respectively, which valves are normally closed when their corresponding and interconnected inlet valves 71, 72, 73 and 74 are open in their inlet ducts 75, 76, 77 and 78. Thus when one of the inlet valves 71 through 74 is closed and its corresponding backwash outlet valve 121 through 124 is opened, the outlet pressure of filtered liquid in the outlet manifold 100 from the other filtering units is sufficient to reverse the flow of liquid in the outlet duct 91, 92, 93 or 94 corresponding to the filtering unit with its inlet valve closed, and backwash the cartridge 90 in that filtering unit with said filtered liquid in said manifold, because of the release of pressure on that filtering unit, since all the backwash outlet discharge valves 121, 122, 123 and 124 discharge directly into the open top of a seepage tank 130. The backwashing pressure through the selected filter chamber being backwashed, may be increased to reduce the time for backwashing, by increasing the resistance of the valves 101 and 103 in the outlet of the outlet manifold 100.

This seepage tank 130 has sufficient capacity to store at least the backwash from one filtering unit and its lower end may be tapered and restricted, as shown by its side wall 131 in FIG. 2, and also immersed in liquid in compartment 20 of the main settling tank 10. This seepage tank 130 may be suspended either from the top of the main tank 10, and/or the frame 108, so that its bottom is above the conveyor 26 along the bottom of the compartment 20.

Near the bottom of the wall of the seepage tank 130 adjacent the outside wall of the reservoir 10, there may be provided one or more seepage apertures or holes 132 (see FIGS. 2 and 5), through which apertures the rapidly dumped or backwashed liquid 133 (see FIG. 2) slowly seeps to raise the level of the liquid in the compartment 20 and overflow the top weir edge 21 into the final settled liquid compartment 18 of the tank 10.

These apertures 132 may extend all along the horizontal narrow bottom of the seepage tank 130, and they also each may be provided with a gating plate 135 as shown in FIG. 5, which may be slid into their other limited dotted line position 136, to either partly or completely cover and close their corresponding aperture by resetting of the screw 137 clamping the gating plate 135 to the side of the seepage tank 130 operating through the slot 138 in the center of the gating plate 135. If desired, the seepage tank 130 may be formed with a multi-tapered bottom as tank 140 shown in FIG. 4, with only its apex 141 being provided with one or more seepage holes 142.

In order to prevent these seepage holes 132 and 142 from becoming clogged with material backwashed off of the filter cartridges 90 in the filtering units 61, 62, 63 and 64, there may be provided a moving wiper means such as a chain 150 which may be guided around pulleys 151, 152 and 153 in the bottom of the seepage tank 130 or 140, and around a driving pulley 154 above the sloping end 155 of the tank 130 or 140. This chain 150 may be driven continuously or intermittently in front of the seepage holes 132 or 142 by a power connection 156 (see FIG. 1) independently from or together with the conveyors 22, 24 and 26 from the power drive cabinet 40. Further to prevent clogging of the holes 132 and 142 spaced links of the chain 150 may include flights or wipers 157 as shown in FIG. 5 for removing settlings from the narrow bottom or apex of the seepage tank 130 or 140, respectively, and dump these settlings over the top sloping edge 158 thereof on to the swarf or material being raised by the flights 37 of the conveyor 26 as it passes up through chute 42 for discharge from the settling part of the system.

The control of the two valves 71 and 121 for each filtering unit simultaneously, may be had through parallel links 161 through 164 connected to pistons 165 through 168 for filtering units 61 through 64 respectively, which pistons may be operated either directly by a reversible solenoid, or by reciprocating fluid motors 171 through 174, respectively. These fluid motors 171 through 174 may be mounted on the frame 108, and may each be provided with separate solenoid operated valves 175 through 178, which valves may be operated successively and intermittently by a cycling switch mounted in a control cabinet 180 on the frame 48 (see FIG. 1). These solenoid valves 175 through 178 are preferably only operated for relatively short periods of time, so that normally, all of the filtering elements 61 through 64 are in operation for filtering the liquid, and then, only for say a fraction of a minute, one of the solenoid valves 175 through 178 is operated every several minutes. Thus the normal filtered liquid output of the system is not materially affected by the backwashing operations. The time between operations of backwashing of separate filtering units should be sufficient so that the backwashing liquid 133 in the seepage tank 130 may be substantially lowered to the overflow level of the partition 21 in the main tank 10, before the next filtering unit is backwashed and dumped into the tank 130. Thus, the tank 130 prevents turbulence in the settling tank 10 when the backwash liquid is quickly dumped therein, and thus stores the backwash liquid 133 temporarily until it can slowly seep through the seepage holes 132 or 142 back into the system.

The fluid for operating the reciprocating motors 171 through 174 may be compressed air from a source 200 and connected through duct 201 to each of the solenoid valves 175 through 178 which alternately introduce air into opposite ends of the cylinders 171 through 174. This air pressure normally maintains the pistons 165 through 168 in their position shown in FIG. 4 for opening the valves 72 and 73 and closing the backwash valves 122 and 123; however, in backwashing operation of the solenoids 175 causes operation of the motor 171 to move the valves 71 and 121 momentarily into their full line positions shown in FIGS. 2 and 4, so that the pressure normally in the outlet manifold 100 from the other filtering unit 62, 63 and 64 will force filtered liquid through the continuously open outlet duct 91 back up through the center of the filter element 90 to wash off the particles formed on the outside thereof, and wash them down through the backwash outlet duct 115 into the seepage tank 130 for gradual settling and recovery of the backwashing liquid back into the system.

As shown in FIG. 1 the control cabinet 180 for the backwash operation may be mounted on the frame 48 and may be directly connected by gearing and/or a shaft 181 to the power drive cabinet 40 for operating the sequence controller for the solenoid valves 175 through 178 connected thereto through conduit 182. Thus, the motor 47 in or connected to the cabinet 40 may control the operation of all the conveyors 22, 24, 26 and 150 as well as the backwashing cycle sequence through connection 181 to control cabinet 180.

While there is described above the principles of this invention in connection with specific apparatus, it is to be clearly understood that this description is made only by way of example and not as a limitation to the scope of this invention.

What is claimed is:

1. In a continuous liquid purification system having a settling part and a filtering part, a pump for pumping settled liquid from said settling part through said filtering part having intake and discharge ducts, and means for backwashing said filtering part, the improvement in said backwashing means comprising: valve means for shutting off the intake duct to said filtering part and simultaneously opening a discharge duct from said filtering part, a seepage tank for receiving the discharge from said filtering part through said discharge duct, said seepage tank being connected to said settling part through a liquid seepage aperture in said tank, and means in said tank for keeping said aperture from becoming clogged.

2. A system according to claim 1 wherein said settling part comprises a settling tank with a plurality of compartments and a weir connecting at least two of said compartments.

3. A system according to claim 2 wherein said liquid seeping aperture in said seepage tank is submerged in the liquid in one of said compartments in said settling tank.

4. A system according to claim 1 wherein said seepage tank is submerged in liquid in said settling part.

5. A system according to claim 1 wherein said filtering part comprises a plurality of individual filtering units, and separate valve means are provided for each of the intake and discharge ducts of each of said units, and include means for successively and intermittently backwashing each of said separate units.

6. A system according to claim 5 including means for backwashing one of said filtering units with the filtered liquid from the other of said filtering units in said system.

7. A system according to claim 1 wherein said means for keeping said aperture from becoming clogged includes a movable means passing in front of said aperture.

8. A system according to claim 1 including means in said settling part for removing settled particles therefrom.

9. A backwash liquid filtering system comprising: a settling tank, a plurality of filtering chambers, an inlet manifold connected to all of said filtering chambers, separate inlet valves in said inlet manifold to each chamber, an outlet manifold connected to all of said chambers, pump means to apply liquid pressure of settled liquid from said settling tank to said inlet manifold and through at least some of said filtering chambers to said outlet manifold, additional separate outlet ducts connected to each filtering chamber, discharge valves in each said separate outlet duct, means for connecting each inlet manifold valve with its corresponding outlet duct discharge valve for the same filtering chamber whereby the opening of one valve closes the other and vice versa, and means for selectively operating said connecting means to close an inlet manifold valve and open its corresponding outlet duct valve whereby liquid pressure from said other filtering chambers forces filtered liquid into the outlet of said chamber with the closed inlet valve to backwash the filter in said chamber through its now open discharge outlet duct, and means for recirculating the resulting backwash liquid from said filtering chamber into said system through said settling tank, said recirculating means comprising a seepage tank for receiving said backwash liquid from the discharge outlet ducts of said filtering chambers, said seepage tank having at least one seeping aperture near its bottom immersed in said settling tank to permit the non-turbulent flow of backwash liquid from said seepage tank into said settling tank, and movable means in said seepage tank for preventing said aperture from becoming clogged.

10. A system according to claim 9 including means for varying the size of said aperture.

11. A system according to claim 9 including means for removing settled particles from the bottom of said settling tank.

12. A system according to claim 9 wherein said movable means includes means for removing sediment from the bottom of said seepage tank.

13. A system according to claim 9 including a valve means in said outlet manifold to maintain a back pressure in said outlet manifold for backwashing purposes.

14. In a continuous liquid purification system having a settling part and a filtering part, a pump for pumping settled liquid from said settling part through said filtering part having intake and discharge ducts, and means for backwashing said filtering part, the improvement in said backwashing means comprising: valve means for shutting off the intake duct in said filtering part and simultaneously opening a discharge duct from said filtering part, a seepage tank for receiving the discharge from said filtering part through said discharge duct, said seepage tank being connected to said settling part through a liquid seepage aperture in said seepage tank, and scraper means in said seepage tank movable relative to said aperture for keeping said aperture from becoming clogged.

15. A system according to claim 14 wherein said scraper means comprises a conveyor in said seepage tank which conveyor also removes particles from said seepage tank.

References Cited in the file of this patent

UNITED STATES PATENTS

| | | |
|---|---|---|
| 1,076,128 | Kupferle | Oct. 21, 1913 |
| 2,429,417 | Magill | Oct. 21, 1947 |
| 2,494,534 | Armstrong et al. | Jan. 17, 1950 |